Figure 1:
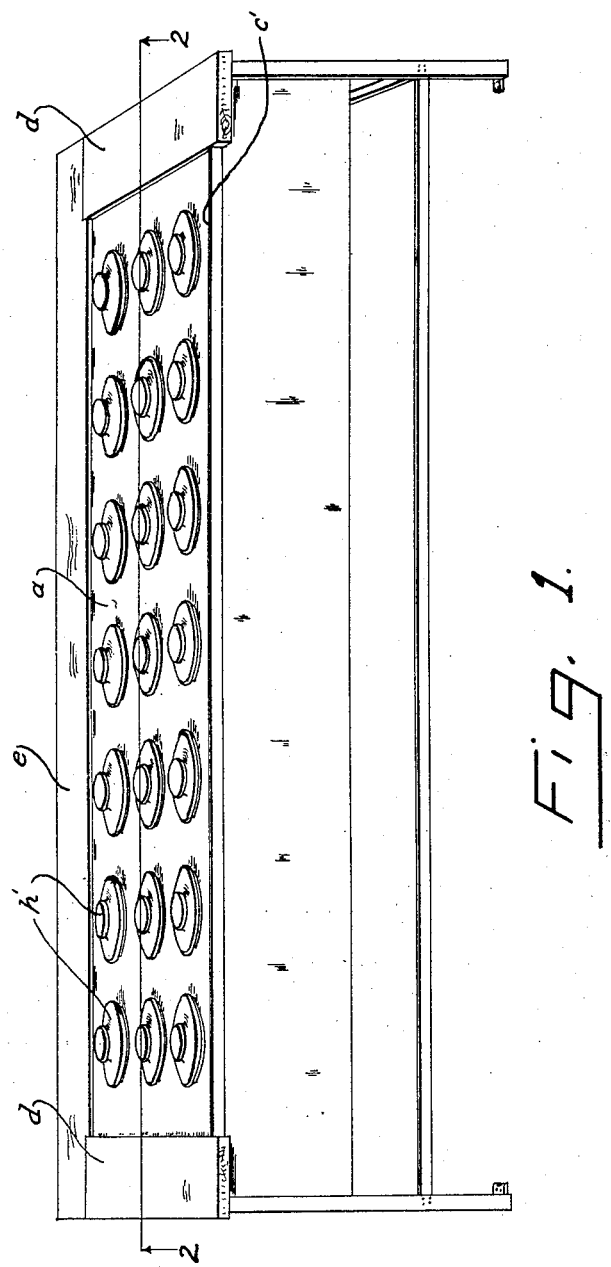

Dec. 20, 1932.    M. RYAN    1,891,559
SALAD TABLE
Filed March 24, 1928    2 Sheets-Sheet 1

INVENTOR
Margaret Ryan
BY
ATTORNEY

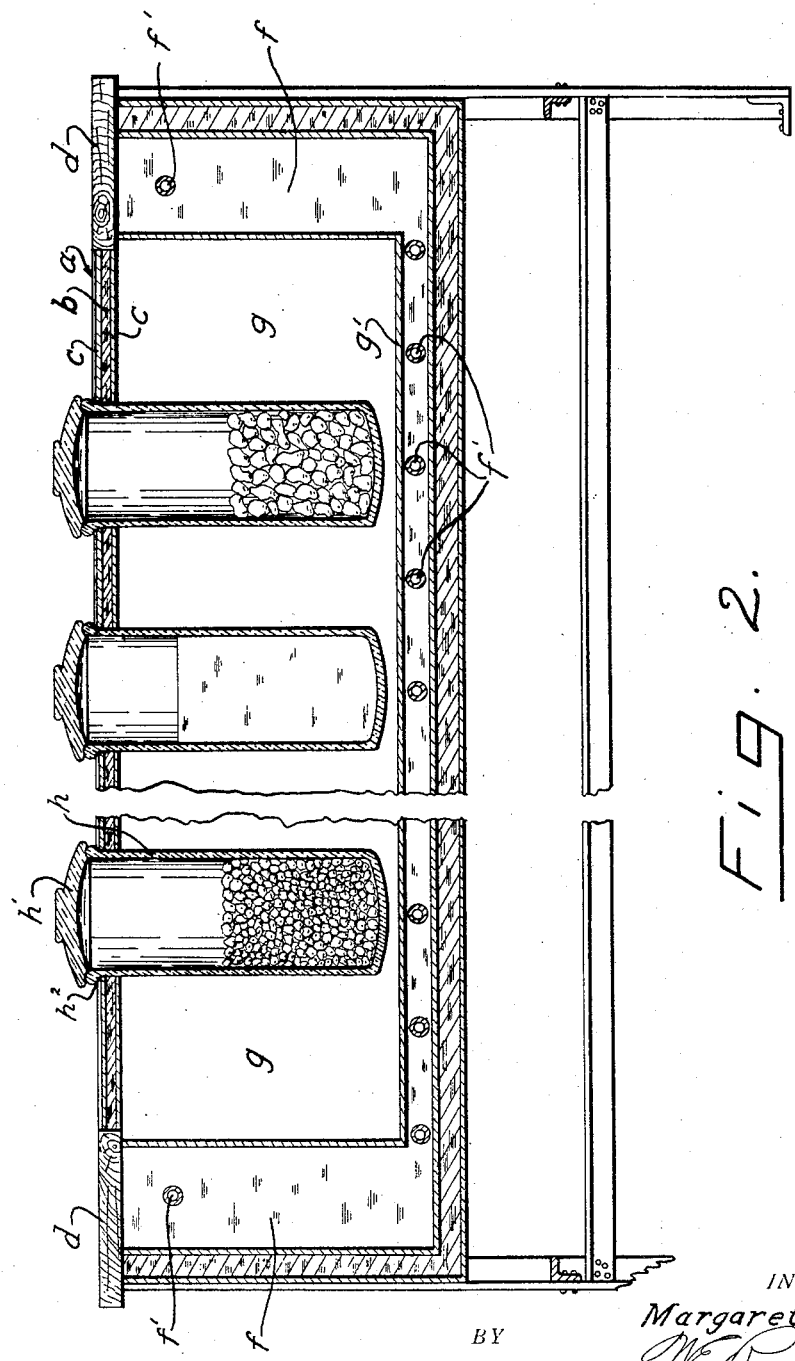

Patented Dec. 20, 1932

1,891,559

UNITED STATES PATENT OFFICE

MARGARET RYAN, OF PORTLAND, OREGON

SALAD TABLE

Application filed March 24, 1928. Serial No. 264,544.

The principal object of my invention is to provide a table or counter from which a number of food stuffs can be served quickly and conveniently, and one where such food stuffs can be held in individual containers recessed in the top of the table or counter and held at a predetermined temperature, and in a clean and sanitary manner.

Specifically, my invention is directed towards the provision of a novel salad table for restaurants and the like, upon which table salads can be built to order and in which table the ingredients can be kept cool, clean and ready for immediate use.

A further object of my invention is to provide an article of this character, which can be manufactured relatively inexpensively, which is compact, and which will have relatively long life requiring minimum attention.

Further and incidental objects are hereinafter described with reference to the accompanying drawings; in which, Fig. 1 is a perspective view looking down upon the top of a salad table embodying my invention; and Fig. 2 is a fore-shortened, longitudinal section thru such table, taken along the line 2—2 in Fig. 1.

My improved table or counter is provided with an insulated top $a$, the center portion of which is preferably built up of slabs of cork $b$, sheathed upon its faces by metal $c$. I have discovered that so-called Monel metal provides an admirable surface and that it is easily kept clean, does not rust and does not show wear unduly.

At the ends of such top, I arrange removable boards $d$, which are adapted to constitute a cutting surface for bread, meats and the like. At the far side of the table, as viewed in Fig. 1, is a longitudinal member $e$ that provides a holding surface for serving dishes and the like. The salad girl stands at the near edge of the table, as viewed in such figure, and a ridge $c'$ is formed thru such edge and serves to prevent liquids from running over the latter. As may be noted in Fig. 1, the boards $d$ are recessed in the member $e$ to prevent the shifting inwardly or end wise in one direction. Such ridge $c'$ also is recessed in such board $d$ to prevent it from shifting end wise in the opposite direction. Such boards $d$ are preferably made removable so as to provide access into the ends of a chamber $f$, in which the refrigerating apparatus or temperature controlling means is mounted. Such means might be a series of pipes as $f'$, arranged conveniently in such chamber or might be ice or any standard type of refrigerant, pipe being shown merely to illustrate one type of temperature controlling means. It is obvious that instead of holding the food stuffs at a reduced temperature, it is equally possible to hold them at an increased temperature by passing steam thru such pipes $f'$ or by arranging electric heating elements in such chamber $f$.

Such chamber $f$ surrounds a chamber $g$, the walls of which are imperforate so as to prevent brine or other heat conducting material, which preferably fills the chamber $f$, from entering into the chamber $g$.

A series of containers $h$ depend into such container $g$ and are supported by the top $b$. Such containers preferably are made of vitreous material and are of substantial thickness, because such material is a poor conductor of heat and thus serves to store up heat in the walls of the container to hold the food in cooled or heated condition. Such containers $h$ are provided with close-fitting covers $h'$, removably placed over the mouths of such containers which open upwardly thru the top $d$, as shown in Fig. 2. Around the mouth of such container is a continuous, peripheral shoulder $h^2$, which engages the upper surface of the table top $a$, to support the container. The under surface of such shoulder $h^2$ is curved or otherwise tapered to seal the container with the top to prevent the escape of cooled or heated air from about the containers h. By arranging the shoulder in this manner, the containers are permitted to extend substantially their entire length within the chamber g, so that the walls of such containers h and the food stuffs contained therein will be maintained at the temperature of the chamber g. This is especially true if the chamber g is cooled because, as is well known, cooled air tends to remain at the bottom of a receptacle and I have discovered that even though the covers h' are removed from the open mouths of the containers for extended periods that the containers will remain cooled at the bottom of the containers. To provide an efficient device, I provide containers of substantial length so that an adequate supply of food stuffs may be held in each container without filling the latter up to the bottom edge of the table top a, and thus the top of the food lies below the upper edge of the chamber g.

The chamber f preferably extends as high as the chamber g and one of the temperature controlling elements, as the type f', is arranged substantially at the top of the chamber f, so as to cool the upper strata of air in the chamber g.

The chamber g preferably is dry, so that the outer surface of the container h will remain clean, and thus such containers may be lifted from place and replaced by similar containers without causing brine or other liquids to be dripped into the adjacent containers of food.

The container f preferably is filled with a liquid heat conducting material, such for example as brine. Varying the temperature of such brine thus causes volumetric changes in such body of liquid. To accommodate changes in volume of such body of liquid, I make the floor g' of the chamber g of relatively flexible material such as a wide span of relatively thin metal. Such changes in volume thus merely flex such bottom, bowing it inwardly when such body expands, and outwardly when it contracts, relatively. The bottoms of the containers h are spaced a substantial distance from such floor g' so that the flexing of the latter will not tend to unseat the containers, nor cause such floor to be frozen to such containers. Spacing such containers also tends to cause the contents of the latter to be maintained at substantially uniform temperature, because a circulation of air in the chamber g is permitted to pass about the entire containers depending thereinto.

I claim:

1. A cooling cabinet provided with a top made of insulating material, the upper face of which is formed to constitute a table, an enclosed continuous, air-filled cooling chamber arranged immediately beneath said top, a plurality of readily removable open-mouthed containers extending above, and depending from, said top, the mouths of said containers extending upwardly from said top and provided with removable covers, said containers being relatively thick-walled and having a substantial factor of heat retention to enable them, when removed from said depending position within said cooling chamber, to tend to prevent temperature fluctuation within said containers.

2. A cooling cabinet provided with a top made of insulating material, the upper face of which is formed to constitute a table, an enclosed continuous, air-filled cooling chamber arranged immediately beneath said top, a plurality of readily removable open-mouthed containers extending above, and depending from, said top, the mouths of said containers extending upwardly from said top and provided with removable covers, said containers being relatively thick-walled, made of vitreous material and having a substantial factor of heat retention to enable them, when removed from said depending position within said cooling chamber, to tend to prevent temperature fluctuation within said containers.

3. A cooling cabinet provided with a top made of insulating material, the upper face of which is formed to constitute a table, an enclosed continuous, air-filled cooling chamber arranged immediately beneath said top, a plurality of readily removable open-mouthed containers extending above, and depending from, said top, the mouths of said containers extending upwardly from said top and provided with removable covers, said containers being relatively thick-walled and having a substantial factor of heat retention to enable them, when removed from said depending position within said cooling chamber, to tend to prevent temperature fluctuation within said containers, each of said containers being provided with continuous lateral shoulders inclined upon their lower surface and adapted when in depending position to engage the upper surface of said insulating top and to extend upwardly therefrom.

4. A cooling cabinet provided with a top made of insulating material, the upper face of which is formed to constitute a table, an enclosed continuous, air-filled cooling chamber arranged immediately beneath said top, a temperature controlling chamber adapted to contain a cooling fluid, said chamber encompassing the sides and bottom of said cooling chamber, the insulating top of said cabinet forming the ceiling of both of said chambers, a plurality of readily removable open-mouthed containers extending above, and depending from, said top, the mouths of said containers extending upwardly from said top and provided with removable covers, said containers being relatively thick-walled, made of vitreous material, and having a substantial factor of heat retention to enable them, when removed from said depending position within said cooling chamber, to tend to prevent temperature fluctuation within said containers, each of said containers being provided with continuous lateral shoulders inclined upon their lower surface and adapted when in depending position to engage the upper surface of said insulating top and to extend upwardly therefrom.

MARGARET RYAN.